Patented Feb. 4, 1941

2,230,616

UNITED STATES PATENT OFFICE 2,230,616

BISMUTH NICOTINATE

Edwin Dowzard, Brooklyn, N. Y., and Leo A. Flexser, Union City, N. J., assignors to The New York Quinine & Chemical Works, Inc., Brooklyn, N. Y., a corporation of New York No Drawing. Application October 3, 1939, Serial No. 297,766

4 Claims. (Cl. 260—270)

This invention or discovery relates to bismuth nicotinates; and it comprises, as a new and valuable therapeutic material, a preparation comprising a bismuth nicotinate of a composition ranging between $Bi(OH)_2R$ and $Bi(OH)R_2$, where R represents the nicotinic radical $C_5NH_4COO'$, said preparation sometimes comprising other bismuth compounds and said nicotinate being a white pulverulent material only slightly soluble in water and dilute acids; it further comprises a method of making such a preparation wherein a soluble nictotinate is brought into reaction with a bismuth salt and the product of reaction is washed and dried; and it still further comprises such a preparation in dosed form suitable for therapeutic purposes; all as more fully hereinafter set forth and as claimed.

Nicotinic acid is pyridine carboxylic acid, $C_5NH_4.COOH$; the carboxyl being carried by a beta carbon of the pyridine ring. It can be made synthetically in many ways, using as starting material various pyridine derivatives carrying an alkyl or other group on a beta carbon. On oxidation the side chain is converted into carboxyl. Nicotinic acid can be so produced from nicotine, whence the name. Nicotinic acid is found in minute quantities rather generally in vegetable and animal tissues used for food; and, like the vitamins, it plays an ill-understood but important part in nutrition. It quite often accompanies the anti-neuritic vitamin B and is a by-product in the complicated chemical processes employed in isolating the extremely small amounts of the vitamin found in rice polishings.

Commercially, however, nicotinic acid is manufactured chemically and is marketed as the free acid; a white crystalline material. This has acquired medical status as a remedy in various deficiency diseases, notably pellagra. In nicotinic acid therapy, as in vitamin therapy, exact dosage and regular results are highly important. In practice, however, it is found that using either the free nicotinic acid or the soluble nicotinates of the alkali bases, the results are irregular.

The acidity of free nicotinic acid sometimes disturbs the stomach but apart from this, the physiological reaction to the administration of nicotinic acid or of nicotinates is quite variable. The particular results depend not only on the temporary acidity of the stomach but also on the nature of the foods present in the digestive tract. Probably there are other factors not understood contributing to the irregularity. Sometimes there are annoying pathological symptoms; "hot flashes." In any event, administration of nicotinic acid as such, or in the form of its salts, presents to the stomach a concentrated preparation in which the nicotinic acid is rapidly available. As stated, in all natural foods where nicotinic acid is present it is in low concentration; in extremely minute amounts on a percentage basis. No great amount of readily available nicotinic acid ever occurs in normal nutriment. The physiological activity of nicotinic acid seems to depend upon the bodies with which it is associated in foods. Free nicotinic acid is an extremely reactive body, having basic functions, due to the pyridine group, as well as acidity. This may be a reason that in administering it as such the contents of the stomach at the time make a difference as to results.

It has now been discovered that in administering nicotinic acid in combination with bismuth, or in association with bismuth compounds, these irregularities of result disappear. In the bismuth nicotinates, the nicotinic acid is slowly available; the nicotinate passes into the digestive tract via the stomach. The nicotinic acid is available but not rapidly; there is no local production of any high concentration of nicotinic acid.

In the administration of nicotinates of bismuth the results are not affected by the temporary acidity or the temporary contents of the stomach and digestive system. The bismuth nicotinates metathesize slowly and provide a slow steady supply of nicotinic acid. The result is more nearly that where a food containing a small fraction of a per cent of nicotinic acid is consumed than that obtained in direct administration of nicotinic acid or soluble nicotinates. Whatever the reason, the regularity of result in using bismuth nicotinate is better, as stated.

It has further been observed that in clinical administration the results obtained are not only regular and predictable but are of different type from that which might have been expected from the several properties of the components united to form bismuth nicotinate.

It is found sometimes worth while to blend bismuth nicotinate with the various bismuth subsalts used in medicine; bismuth subnitrate for example.

From a stoichiometric point of view bismuth is trivalent; as in $BiCl_3$. The tri salts, however, hydrolyze readily down to the subsalts, such as bismuth subnitrate, or BiOCl, which are those mostly used in medicine.

Bismuth oxide alone has no great physiological action because of the insolubility of bismuth compounds in the body fluids. However, some bismuth subsalts have been given internally to coat irritated parts of the digestive system. Regarded purely as a bismuth compound, the bismuth subnicotinates are believed to be better than the bismuth compounds ordinarily used. The nicotinic acid has a healing effect on irritated tissues; a fact noted in the ordinary administration of nicotinic acid in the early stages of pellagra.

Certain bismuth preparations have been employed heretofore as intramuscular injections in the treatment of syphilis, and here again the bismuth nicotinates seem to be superior to the bismuth compounds previously available. In these latter, only the bismuth is useful but in bismuth nicotinates both of the constituents are active in some degree in treatments combating spirochetic maladies.

To summarize, the bismuth nicotinate preparations of the present invention constitute improved therapeuticals for use not only when nicotinic acid is indicated but when bismuth is to be administered internally or by injection.

In the present invention, bismuth nicotinates are produced with a molecular formula ranging between $Bi(OH)_2R$ and $Bi(OH)R_2$; R signifying the nicotinic radical. All the preparations within this range are useful. The dinicotinate ($Bi.OH.R_2$) in a dry pulverulent state contains about 52 per cent nicotinic acid, while the mononicotinate contains about 33.5 per cent. These preparations may be made in various ways: directly by taking up nicotinic acid with bismuth hydroxide or metathetically by producing a reaction between a soluble nicotinate, such as sodium nicotinate, and a salt of bismuth, such as the subnitrate. Or a mixed method may be used, a subsalt being first formed, metathetically, and then treated with nicotinic acid to increase the percentage of nicotinic acid; by combination or adsorption or both.

In a typical method of making preparations under the present invention, bismuth subnitrate is suspended in hot water containing nicotinic acid in solution. Good proportions are of the order of one part by weight of the subnitrate to 20 parts of hot water containing one part of nicotinic acid. After admixture is effected the liquid is kept at a temperature between 50° and 100° C., with frequent stirring. From time to time samples are withdrawn and assayed for residual free nicotinic acid. When the free nicotinic acid has fallen to the desired residual concentration the liquid is cooled, filtered and the insoluble bismuth nicotinate thoroughly washed and dried. It is a fine white powder, very slightly soluble in water and stable in handling and storage. While the contained nicotinic acid is available in the digestive tract it is not given up to water; the compound does not readily hydrolyze. As stated, the percentage of nicotinic acid may go as high as 52 per cent, corresponding to the dinicotinate. Preparations containing lower ratios of nicotinic acid are also useful, and are often advantageous. Such preparations are readily obtained by this method, as by allowing some of the subnitrate to be recovered unreacted in the final product. Or, pure nicotinate can be made and then directly admixed with a bismuth compound, such as subnitrate, in any desired ratio. The mono-nicotinate contains about 33 per cent nicotinic acid but lower percentages of nicotinic acid are useful. The lower the percentage of nicotinic acid the nearer the preparation simulates natural conditions. A bismuth compound containing from 2 to 10 per cent nicotinic acid is distinctly better as a bismuth preparation and the nicotinic acid is useful.

One preparation of relatively low nicotinic acid content which has been found useful can be made by dissolving about 10 parts nicotinic acid and about 3 parts sodium hydroxide in 100 parts of water; all by weight. The pH is adjusted to 7 by the use of neutralizing agents. To the aqueous liquid is added 10 parts by weight of "bulky" bismuth subnitrate and the mixture is kept at 95 to 100° C. for about two hours. The product is filtered off, washed and dried. A bismuth subnicotinate constitutes about 60 per cent of the product.

In lieu of using the bismuth subnitrate stated in the specific examples, bismuth hydroxide may be employed as may other bismuth compounds such as the nitrate, chloride, sub-chloride, salicylate, acetate, etc. But bismuth subnitrate is commercially economical and convenient and it does not leave the mother liquor ballasted with any great amount of mineral salts.

Using any of these materials the physical character of the product changes somewhat. Other variables are temperature, dilution and time. Commercially "dense" and "light" forms of bismuth compounds give different results. The differences are more physical than chemical, and the conditions can be adjusted to give dense or light products at will. In all cases, the nicotinic acid is combined with the bismuth in fixed form; it cannot be washed out by water or extracted by alcohol.

Sometimes in therapeusis a high nicotinic acid content is desired, up to the 52 per cent of the dinicotinate, but more often a lower nicotinic acid content is desired. Even the mono-nicotinate with 33.5 per cent sometimes represents too great a nicotinic acid concentration. Where this is the case the preparation may be diluted with bismuth salts; unreacted bismuth compounds left in the manufacture or mechanically admixed bismuth compounds. Very low percentages of nicotinic acid, say 2 or 3 per cent, materially improve bismuth compounds and are useful.

The preparations may be dispensed in dosed amounts and in a form suitable for clinical administration; capsules, pills, sirups, etc.

What is claimed is:

1. As a new and useful therapeutic composition, a bismuth nicotinate.

2. A therapeutic preparation containing bismuth nicotinate.

3. A therapeutic preparation containing combined bismuth and nicotinic acid with a nicotinic acid content ranging between 10 and 52 per cent.

4. The process of preparing compositions containing bismuth nicotinate, which comprises adding bismuth subnitrate and nicotinic acid to an ample amount of hot water, maintaining the system at a temperature of about 50° to 100° C., with agitation, until the desired combination of bismuth and nicotinic acid is effected, cooling, and separating from the liquid a solid reaction product containing about 10 per cent to 52 per cent of combined nicotinic acid.

EDWIN DOWZARD.
LEO A. FLEXSER.